(12) United States Patent
Hoga et al.

(10) Patent No.: US 7,468,949 B2
(45) Date of Patent: Dec. 23, 2008

(54) METHOD AND DEVICE FOR MEDIUM-REDUNDANT OPERATION OF A TERMINAL IN A NETWORK

(75) Inventors: Clemens Hoga, Nuremberg (DE); Rudolf Neite, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 438 days.

(21) Appl. No.: 10/544,622

(22) PCT Filed: Oct. 12, 2003

(86) PCT No.: PCT/DE03/04130
§ 371 (c)(1),
(2), (4) Date: Aug. 5, 2005

(87) PCT Pub. No.: WO2004/071010
PCT Pub. Date: Aug. 19, 2004

(65) Prior Publication Data
US 2006/0067208 A1    Mar. 30, 2006

(30) Foreign Application Priority Data
Feb. 6, 2003    (DE) .............................. 103 05 415

(51) Int. Cl.
*H04J 1/16* (2006.01)
(52) U.S. Cl. .................. 370/244; 370/219; 370/245
(58) Field of Classification Search .......... 370/216, 370/217, 219, 244, 245, 242, 218
See application file for complete search history.

(56) References Cited

U.S. PATENT DOCUMENTS 5,859,959 A * 1/1999 Kimball et al. ............... 714/4
5,959,972 A * 9/1999 Hamami ..................... 370/228

(Continued)

FOREIGN PATENT DOCUMENTS

| EP | 0 981 226 A1 | 2/2000 |
| WO | WO98/49620 | * 11/1998 |
| WO | WO 00/76147 A1 | 12/2000 |
| WO | WO 03/021858 A1 | 3/2003 |

OTHER PUBLICATIONS

Industrial Ethernet™ startet durch—Switching und 100 Mbit/s in der industriellen Kommunikation, Karl Glas, Simatic Net, Siemens AG, Stand Oktober 1998.

(Continued)

*Primary Examiner*—Ricky Ngo
*Assistant Examiner*—Dewanda Samuel
(74) *Attorney, Agent, or Firm*—Laurence A. Greenberg; Werner H. Stemer; Ralph E. Locher

(57) ABSTRACT

The invention relates to a method and device for medium-redundant operation of a terminal in a network. The device comprises: a first transmission device (6) of a physical bit transmission plane which is connected to a network component (9) via a first connection medium (8) disposed between the first transmission device (6) and a network component (9) and which can produce an error signal during automatic monitoring of link to the network component (9) if no physical link or if a defective link to the network component (9) exists; another transmission device (7) on the physical bit transmission plane, which is connected to the network (4) via another connection medium (10); and a control device (5) which is connected to the first transmission device (6) and the other transmission device (7) in order to deactivate the first transmission device (6) as a reaction to the error signal therefrom, enabling activation of the other transmission device (7) and enabling an electronic error telegram to be sent to the network (4) via the other connection medium (10) by means of the other transmission device (7). The invention also relates to a method for operating said device.

34 Claims, 4 Drawing Sheets

U.S. PATENT DOCUMENTS

| | | | |
|---|---|---|---|
| 6,128,296 | A * | 10/2000 | Daruwalla et al. ........... 370/389 |
| 6,175,571 | B1 * | 1/2001 | Haddock et al. ............ 370/423 |
| 6,366,557 | B1 * | 4/2002 | Hunter ........................ 370/217 |
| 6,392,990 | B1 * | 5/2002 | Tosey et al. ................. 370/218 |
| 6,594,227 | B1 * | 7/2003 | Ogawa et al. ................ 370/216 |
| 6,735,198 | B1 * | 5/2004 | Edsall et al. ................. 370/389 |
| 6,766,482 | B1 * | 7/2004 | Yip et al. .................... 714/717 |
| 6,975,637 | B1 * | 12/2005 | Lenell ........................ 370/412 |
| 7,260,066 | B2 * | 8/2007 | Wang et al. ................. 370/248 |
| 2002/0023150 | A1 | 2/2002 | Oasafune et al. |
| 2002/0057712 | A1 * | 5/2002 | Moriwaki et al. ........... 370/463 |
| 2004/0233919 | A1 * | 11/2004 | Arnold et al. ............... 370/401 |

OTHER PUBLICATIONS

Cabletron Systems: "FDDI Technology Guide", Order No. 9031708, Apr. 1996.

Cabletron Systems: "FDMMIM, FDMMIM-04, FDMMIM-24, and FDMMIM-30 FDDI Concentrator Ethernet to FDDI Bridge Modules"- Installation and User's Guide, Part No. 9030670-03, Jul. 1994.

IEEE Standard for Local and metropolitan networks- Common Specifications: "Part 3: Media Access Control (MAC) Bridges- Amendment 2: Rapid Reconfiguration", IEEE Std 802.1w-2001, Jun. 14, 2001.

ISO/IEC 9314-6, First Edition Aug. 1998, International Standard, "Information technology- Fibre distributed data interface (FDDI)- Part 6: Station Management (SMT)", Aug. 1998.

ISO/IEC 15802-3: 1998, ANS/IEEE Std. 802. 1D, 1998 Edition (Revision and redesignation of ISO/IEC 10038: 1993 [ANS/IEEE Std 802.1D, 1993 Edition], Incorporating IEEE supplements P802.1p, 802.1j-1996, 802.6k-1992, 802.11c-1998, and P802.12e): "Information Technology- Telecommunications and information exchange between systems- Local and metropolitan area networks-Common specifications- Part 3: Media Access Control (MAC) Bridges", 1998.

Borowka et al.: "Hub-Systeme", Datacom, pp. 381-471, 1994.

* cited by examiner

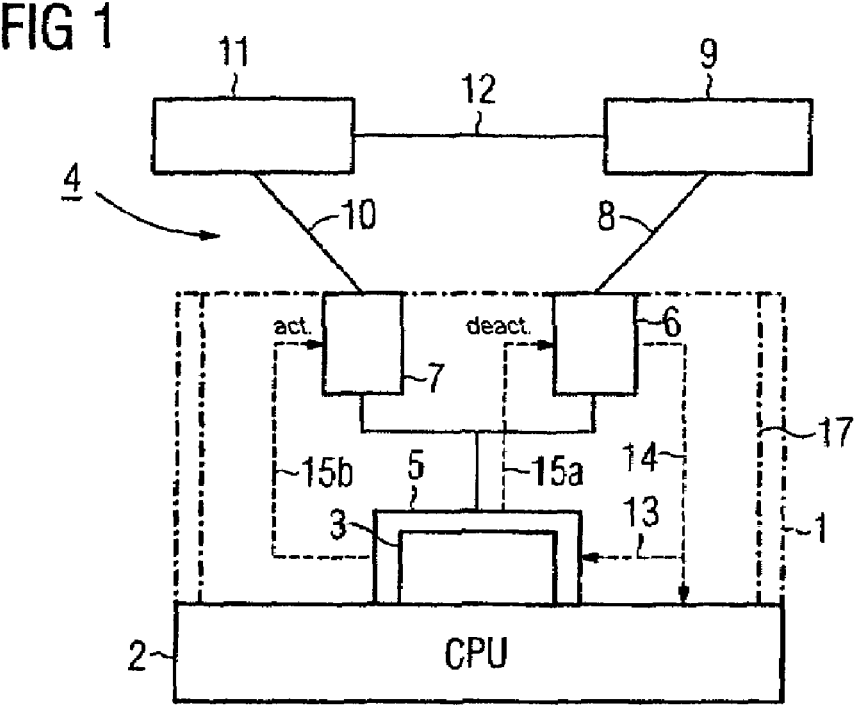
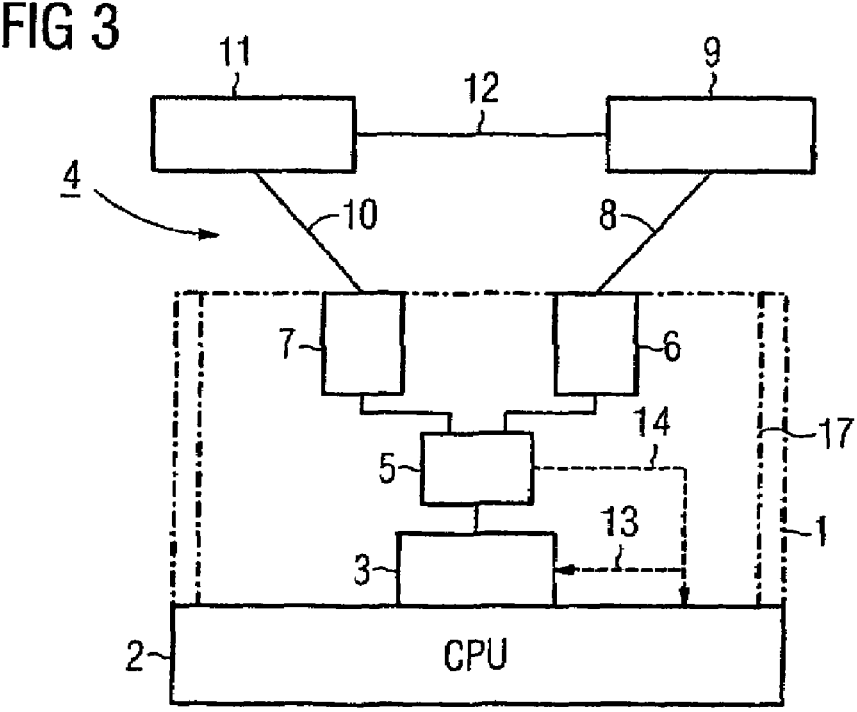

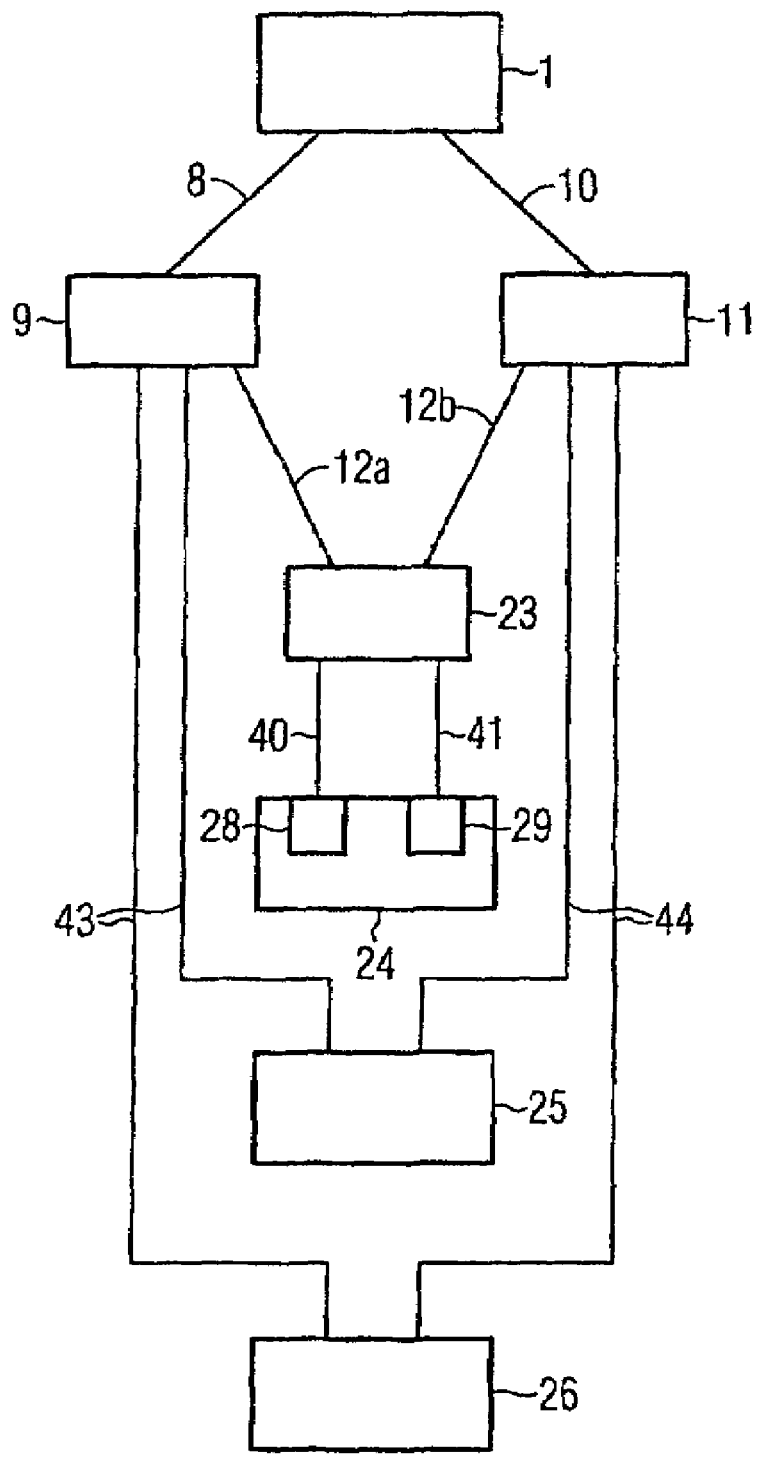

METHOD AND DEVICE FOR MEDIUM-REDUNDANT OPERATION OF A TERMINAL IN A NETWORK

CLAIM FOR PRIORITY

This application claims the benefit of priority to international application No. PCT/DE2003/04130, which was published in the German language on Dec. 10, 2003, which claims the benefit of priority to German Application No. 103 05 415.4, filed on Feb. 6, 2003, the contents of which are hereby incorporated by reference.

TECHNICAL FIELD OF THE INVENTION

The invention relates to a method and an apparatus for media-redundant operation of a terminal in a network.

BACKGROUND OF THE INVENTION

The expression network component covers any apparatus which can send and/or receive data packets in the network. In this sense, network components may, for example, be switches or hubs. A switch is an active network component for connecting individual segments of a network to one another. A hub is likewise an active network component, for example a star coupler. The expression connecting medium is used for components of a network via which data and signals can be physically transmitted between different network components. These include, for example, twisted pair cables, coaxial cables and fiber-optical cables. The expression medium covers not only the pure connecting medium but also its connecting components to the network on the one hand (network components) and to the terminal on the other hand (transmission devices). However, since the connecting media in particular may be affected by possible failures, for example as a result of external destruction, these represent the major focus for the design of a media-redundant connection. If a terminal is connected to the network via two physically independent media (media redundancy), then, if one of the media fails, safe and reliable communication is nevertheless possible with the terminal. Since disturbances to individual media are unavoidable, manufacturing failures can be avoided by means of media redundancy in the case of media disturbances, for example in production operations.

Media redundancy can be achieved in a terminal by, for example, equipping the appliance with two transmission devices each having their own media access controller, which controllers are connected to the network via different connecting media. This configuration can be provided in the terminal, for example in the form of two separate network boards. In this case, conventional network components may be used for the inclusion of a terminal. Furthermore, failure monitoring is possible even into the terminal itself, from application to application, in all network protocol layers separately for the two different network links. However, this has the disadvantage that two network boards are necessarily required in each terminal, and this leads to an increase in the costs of the terminals. Furthermore, in this situation, each terminal must be assigned two media access control addresses (MAC addresses) as well as two Internet Protocol addresses (IP addresses). Failure monitoring and a change between the two connections via the two network boards takes place at a higher network protocol layer, generally at the application layer, and is thus done using computer capacity in the terminal. Failure monitoring at the application layer thus results in the computer power of the terminal being restricted with regard to the actual application. The switching times in the event of a disturbance in one of the media are typically in the region of 100 ms.

Another implemented approach for achieving media redundancy is referred to as the ring redundancy approach. This approach is described, by way of example, in the document "Industrial Ethernet™ startet durch—Switching und 100 Mbit/s in der industriellen Kommunikation" [Industrial Ethernet™ starts by—switching and 100 Mbit/s in industrial communication], K. Glas, 1998. In this case, one or more terminals is or are connected to a ring network. If this network is interrupted at one point, then all of the terminals and network components in the ring network are still connected to one another, such that they are still fully serviceable. In this solution, the terminals each require only one network board with one transmission device and one media access controller. In the event of a disturbance, switching takes place at a so-called second network protocol layer ("layer 2"). At the application layer, no program is required for failure monitoring, although no monitoring from application to application is possible, either. Another disadvantage is that the switching times are in the region of 200 ms. A further disadvantage is that it is not possible to use standard switch components to produce the network. The only switch components which may be used are those which are specially designed for use in a network with ring redundancy.

SUMMARY OF THE INVENTION

The invention relates to a method and an apparatus for media-redundant operation of a terminal in a network. When electronic terminals are being linked, for example computers or electronically controlled manufacturing machines, by means of a network, it is desirable for media redundancy to be provided for each terminal. A terminal may in this case be any desired device which has a network component of the network or is connected to such a component.

In one embodiment of the invention, there is a method and apparatus for safe, reliable, low-cost and fast media-redundant operation of a terminal in a network, on the basis of media redundancy achieved by duplication of the transmission devices and of the associated media access controllers.

In another embodiment of the invention, there is a terminal connected to a network via two transmission devices in a physical bit transmission layer, of which devices one is active at a time, in order to interchange data with the network. The transmission devices are connected to a single control device. If the first (active) of the two transmission devices finds that there is no good connection between it and the network via a first connecting medium, it is deactivated by the control device, the further transmission device is activated as the active transmission device, and an electronic failure message is sent into the network, so that the network can adapt itself to the change that has occurred with respect to the activity status of the two transmission devices, and its consequences with regard to the passing on of data for that terminal. The connection between the terminal and the network is then provided by means of the second (redundant) connection via the further transmission device and the further connecting medium.

One advantage of the invention is that a method and an apparatus are provided which allow very fast switching of the redundant link between a terminal and a network. The expression "fast switching" describes the fact that the data interchange between the terminal and the network, which is handled via a first connecting medium, can be continued after a very short time, that is to say quickly, via the further connecting medium in the event of a disturbance or an interruption in this first connecting medium. Since the change from the first connecting medium to the further connecting medium requires only the deactivation of the first transmission device, for which the disturbance was found, and the activation of the further transmission device in the physical bit transmission layer, as well as the sending of an electronic failure message, the change can be carried out in less than about 1 ms. The switching need not be initiated at a higher network protocol layer. The invention may not only be implemented in an electronic circuit, but may also be implemented by means of software, which interacts with an electronic circuit. An apparatus according to the invention can be produced at low cost and is suitable not only for use in appliances to be designed from new, but also for use with old appliances, in order to connect them to the network with media redundancy.

Still another embodiment of the invention comprises a data packet to be transmitted from the terminal to the network being analyzed by an analysis device, a media access control address being determined in the process and being assigned to a media access controller for the terminal, and the media access control address being inserted into the electronic failure message during the production of the electronic failure message. These method steps make it possible to carry out the method independently of any prior knowledge of the media access control address of the media access controller for the terminal.

One advantageous embodiment of the method according to the invention furthermore provides for the network to analyze the failure message and to adapt itself to it in such a way that data packets which are addressed to the terminal are passed on to the further connecting medium. This means that the network can adapt itself in a very short time to the change in the connecting medium via which the terminal is connected to the network. This avoids unnecessary network traffic, and data packets are no longer passed to the connecting medium which is faulty or is subject to a disturbance.

Another embodiment of the method according to the invention provides that the network component analyzes the failure message and adapts its address addressing table for the media access controller for the terminal in such a way that data packets which are addressed to the terminal are passed on to the further connecting medium. This allows particularly fast switching of the network, since only the settings of the network component need be changed.

Furthermore, one advantageous embodiment of the method according to the invention comprises the use of a network component, to which the first and the further connecting medium are connected. In this case, the network component just has to internally redirect the data packets that are addressed to that terminal to another connection in order to switch the connection to that terminal from the first (disturbed) connecting medium to the further connecting medium. This can be done particularly easily and quickly when using a network component that is designed appropriately for this purpose.

However, one particularly advantageous embodiment for the method according to the invention is regarded as the use of a further network component, to which the further connecting medium is connected. This also achieves redundancy with regard to a failure of one of the network components to which the terminal is connected directly.

A further embodiment of the method consists in that a communication is carried out from the terminal with the network component by means of a standard network protocol, in particular an Internet Control Message Protocol (ICMP), in order to check the serviceability of the network component. This allows the terminal additionally to react even to those failures of the network component in which a sound physical connection still exists between the transmission device and the network component, despite the failure.

It is also advantageously possible to provide for an application to be run on the terminal, and for the application to interchange checking data packets after predetermined time intervals with another network component which is connected to that network component, in order to determine whether the network component is serviceable. This means that it is possible to monitor the failure of the network component when the latter is not able to communicate by means of the standard network protocol.

Another embodiment of the method provides for the other network component to produce an application failure signal if it has not received any of the checking data packets after a predetermined number of predetermined time intervals. This makes it possible to detect a failure of the application on the other network component. If, for example, the application in the terminal is instructed to interchange data with the other application in the other network component, then it is important to be able to distinguish between "network disturbances" and application failures, in the event of communication disturbances.

With regard to the apparatus according to the invention, one advantageous embodiment provides that the first and the further connecting medium are connected to the network component. This makes it possible to switch particularly quickly to the second connecting medium in the event of a failure of the first connecting medium, since the network component just has to switch internally to another connection. However, an appropriately designed network component must be used for an embodiment such as this.

One alternative advantageous embodiment of the apparatus according to the invention provides that the further transmission device is connected to another network component via the further connecting medium. This means that the apparatus is also provided with redundancy with regard to a failure of the network component or of the other network component.

Another advantageous embodiment of the apparatus provides that the transmission device, the further transmission device and the control device are arranged on a network board in the terminal. This allows the apparatus to be integrated in a terminal in a simple manner. This also makes it possible to connect commercially available personal computers with media redundancy to a network.

One embodiment consists in that the transmission device, the further transmission device and the control device are arranged in a redundancy switch, which is connected to the terminal. A redundancy switch such as this allows terminals which are not designed for this purpose to be connected with media redundancy, without having to modify the terminals.

A further embodiment of the apparatus provides for the redundancy switch to have an additional transmission device in the physical bit transmission layer, in order to interchange data packets with the terminal. This development allows a network-compatible terminal to be connected to the network with media redundancy, without any additional precautions. In addition, this development can be used to connect a terminal not only via two separate connecting media, but also via two different connecting media types, for example via a twisted pair cable and via a fiber-optical cable.

A further advantageous embodiment of the apparatus provides an analysis device for analysis of a data packet to be transmitted into the network from the terminal, in order to determine a media access control address and in order to insert the media access control address into the electronic failure message. This embodiment can be operated without any prior knowledge of the media access control address of the terminal, and is particularly advantageous when the media access control address changes as a result of replacement of the media access controller in the course of servicing or upgrading work on the terminal, since the new media access control address is determined automatically in this embodiment.

One embodiment of the invention is for the control device to have the analysis device. This results in a compact embodiment.

Another advantageous embodiment of the invention provides for the control device to be an electronically programmable logic device (ELPD). A control device such as this costs little and can easily be matched to a media access control address for the terminal. This development means that it is possible to change particularly quickly from the connecting medium to the other connecting medium.

Another embodiment of the apparatus provides for the control device to comprise the media access controller. This development makes it possible to design a very compact and low-cost embodiment of the invention.

BRIEF DESCRIPTION OF THE DRAWINGS

The invention will be explained in more detail in the following text using exemplary embodiments and with reference to the drawings, in which:

FIG. 1 shows a terminal which is connected with media redundancy to a network.

FIG. 2 shows a schematic illustration of a network.

FIG. 3 shows another embodiment of a terminal, which is connected with media redundancy to a network.

DETAILED DESCRIPTION OF THE INVENTION

Figure 4:
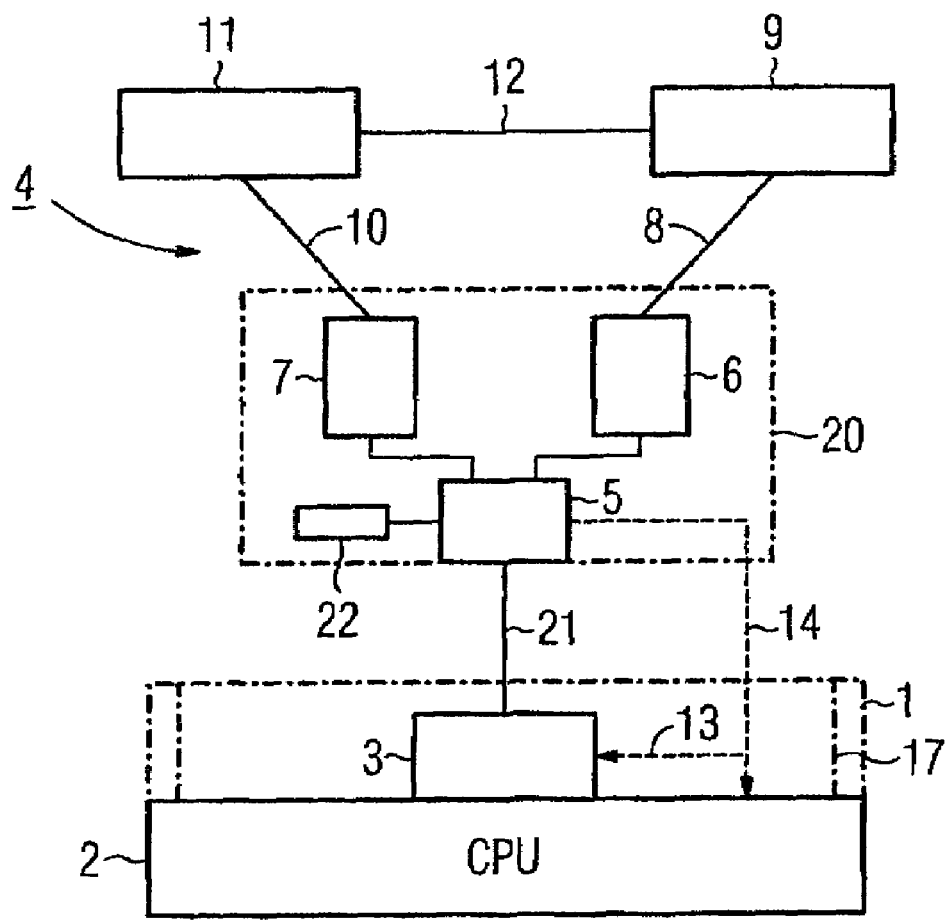
FIG. 4 shows an apparatus for media-redundant operation of a terminal in a network.

FIG. 1 shows a terminal 1 which is connected with media redundancy to a network 4. By way of example, it is assumed here that the network 4 is an Ethernet network. However, the invention can also be used in other network types. The terminal 1 has a processor (CPU) 2, which controls the terminal 1 and runs applications on the terminal 1. The processor 2 is connected to a control device 5 which, in this embodiment, comprises a media access controller (MAC) 3. The media access controller 3 controls the connection of the terminal 1 to the network 4 on a so-called second network protocol layer ("layer 2"). The media access controller 3 is assigned a unique media access control address (MAC address), by means of which the media access controller 3 for the terminal 1 is distinguished from other media access controllers for further terminals in the network 4. The control device 5 is connected to a transmission device 6 for a so-called physical bit transmission layer ("physical layer device"-PHY) and to a further transmission device 7 in the physical bit transmission layer. The transmission device 6 and the further transmission device 7 convert the data transmitted to them from the media access controller 3 into physical signals, which can be transmitted via a first connecting medium 8 and via a further connecting medium 10. The connecting media may comprise coaxial cables, twisted-pair cables, glass-fiber cables, wireless connections, etc. The transmission device 6, the further transmission device 7 and the media access controller 3 may expediently be combined on one network board 17.

The transmission device 6 is connected to a network component 9 via the first connecting medium 8. The further transmission device 7 can likewise be connected to the network component 9 via the further connecting medium 10. In a situation such as this, media redundancy exists for the connection of the terminal to the network only with regard to the connecting media 8 and 10. In this situation, an appropriate network component 9 must be used, which internally converts the connection to the terminal to the other connecting medium in the event of a failure of one of the connecting media.

However, the following text will consider the situation as illustrated in FIG. 1, in which the further transmission device 7 is connected to another network component 11 via the further connecting medium 10. The network component 9 and the other network component 11 may each in particular be a switch, a HUB or the like. The network component 9 and the further network component 11 are connected to one another via another connecting medium 12.

During operation, only the first transmission device 6 or the further transmission device 7 is in each case active. The first transmission device 6 and the further transmission device 7 are activated/deactivated by the control device 5 in this embodiment. The first transmission device 6 and the further transmission device 7 carry out autonomous automatic monitoring, in order to determine whether there is a sound physical connection via the appropriate first connecting medium 8 and the further connecting medium 10, respectively, to the network component 9 and to the other network component 11. This check is referred to as a connection status check or a link status check. During this check, the MAC address that is assigned to the media access controller 3 is not transmitted to the first network component 9 and to the other network component 11.

Those skilled in the art will be familiar with the method of operation of the link status check by the first transmission device 6 and the further transmission device 7 in the physical bit transmission layer. By way of example, the link status check will be explained for the first connecting medium 8. It is assumed that the first connecting medium 8 comprises an optical fiber and a further optical fiber, as is normal for optical connecting media. The first transmission device 6 uses the optical fiber to send test signals based on a protocol for the bit transmission layer to the network component 9. During normal operation, the network component 9 "reflects" the test signals to the further optical fiber. If it is now also assumed that the first connecting medium 8 is detached from the network component 9, then the latter identifies from the lack of the "reflected" test signals that the first connecting medium 8 has been disturbed. A so-called "far end fault" is present.

In order to ensure that either the first transmission device 6 or the further transmission device 7 is active at one time, and sends data packets using the MAC address assigned to the media access controller 3, it is possible for the network 4 to configure itself such that the data packets directed to the terminal 1 from the network 4 are transmitted to the active transmission device of the physical bit transmission layer.

In order to explain the reaction to a media failure, it is assumed that the first transmission device 6 is active initially. If a disturbance now occurs on the first connecting medium 8, then the first transmission device 6 finds during the link status check that there is no longer a sound physical link to the network component 9. The failure of the connection is transmitted to the control device 5, as is indicated by an arrow 13. Furthermore, the fault can also be transmitted to other components of the terminal, for example the processor and to programs in higher network protocol layers, in particular the application layer, as is indicated by arrow 14.

As soon as the connecting media failure is found by the first transmission device 6, it is deactivated by the control device 5 and the further transmission device 7 is activated, as is indicated by other arrows 15a and 15b. In order to allow the network 4 to continue to transmit the data packets intended for the terminal 1 via the further connecting medium 10 to the terminal 1 a failure message is first of all sent via the other network component 11 to the network. The failure message is advantageously in the form of a so-called multicast message. This message therefore contains no addressee and is passed on to all of the network components in the network 4 which belong to the network in the physical bit transmission layer. The network can also be formed by a network element which comprises all of those network components to which data packets of the terminal 1 can be passed on exclusively on an MAC address basis.

Intelligent network components in the network, in particular switches and other terminals, can adapt their MAC address addressing tables on the basis of the failure message, which includes the MAC address assigned to the media access controller 3. The expression intelligent network component in this case covers any network component which can analyze the data packets received by it and is able to react in some way to a result of the analysis.

The analysis of the failure message and the adaptation of the addressing tables can be carried out by any intelligent network components or, by way of example, predominantly by the network component 9. After a failure of the connection to the terminal 1 via the first connecting medium 8 and the first transmission device, this network component 9 can pass on the data packets intended for the terminal 1 via the other connecting medium 12 to the other network component 11.

In the situation where the two transmission devices 6 and 7 are connected via the connecting media 8 and 10 to the one network component 9, the data packets which are intended for the terminal 1 is passed on internally in the network component 9 to a connection which is connected to the further connecting medium 10.

The deactivation and the switching from the first transmission device 6 to the further transmission device 7 can be carried out in the second network protocol layer (layer 2) or in a higher network protocol layer. The switching can also be carried out by a control device 5, which need not comprise the media access controller 3. The failure message can likewise be produced in the second network protocol layer (layer 2), for example by means of an electronically programmable logic device ("Electronic Programmable Logic Device" (EPLD)) or an application-specific integrated circuit (ASIC), or can be produced in a higher network protocol layer. The failure message can be coded in such a way that the media failure and switching operations are indicated to all the communication partners. The production of the failure message may also include data being read in from a memory, in particular from a read only memory (ROM).

In addition to the monitoring of a failure of one of the connecting media 8, 10, it is also possible to monitor for a fault in the network component 9 and in the other network component 11. If the network component 9 and the other network component 11 are each in the form of an intelligent component, then failure identification can be ensured by means of cyclic sending of requests to the network component 9 and to the other network component 11 on the basis of a standard protocol, such as the ICMP (Internet Control Message Protocol). The correctly operating network component 9 and the other network component 11 respond to the requests.

FIG. 2 shows an enlarged detail from the network 4. The same features in FIGS. 1 and 2 are provided with the same reference symbols. In the exemplary embodiment shown in FIG. 2, an additional network component 23 or further terminals 25, 26, which are likewise connected directly to the network component 9 and to the other network component 11, respectively, can be checked in the manner described above.

The check for failure identification via an ICMP communication can selectively also be triggered or initiated by an application in the terminal 1 using the so-called watchdog method (monitoring method). In this case, a communication based on the standard protocol, in particular an ICMP communication, with the additional network component 23 or with one of the further terminals 25, 26 which are connected directly to the network component 9 to which the transmission device 6 (which is assumed to be active in this case) is connected, is carried out at specific time intervals. The additional network component 23 or one of the further terminals 25, 26 can use the lack of this communication in accordance with the standard protocol to deduce that the network component 9 has failed.

The application in the terminal 1 can likewise produce an "other component failure signal" if no more request data packets are received by the application in the terminal 1 in accordance with the standard protocol, when such request data packets are initiated by the other application in the additional network component 23 or by one of the further terminals 25, 26.

In the embodiment shown in FIG. 1, the first transmission device 6 and the further transmission device 7 were connected to the network component 9 and to the further network component 11. FIG. 2 shows an embodiment of an additional terminal 24, in which the transmission device 28 and the further transmission device 29 are connected to the additional network component 23 via two different connecting media, a connecting medium 40 and a further connecting medium 41. This embodiment also ensures connecting media redundancy for the additional terminal 24. In this embodiment, however, the redundancy is lost in the event of a total failure of the additional network component 23.

In the embodiment shown in FIG. 1, the network component 9 was connected directly to the other network component 11 via the other connecting medium 12. FIG. 2 shows a different network topology. The additional network component 23 is arranged between the network component 9 and the other network component 11, and subdivides the other connecting medium 12 into two parts 12a, 12b. Further additional network components can also be arranged between the network component 9 and the other network component 11, provided that the configuration ensures that multicast data packets from the further additional network components are passed on from the network component 9 to the further network component 11, and vice-versa.

If the further terminals 25, 26 are intended to be connected to the network with media redundancy, in addition to the terminal 1, then it is worthwhile providing a first connecting medium 43 to the network component 9, and a second connecting medium 44 to the other network component 11, from each of the further terminals 25, 26. This creates a clear network topology, and additionally means that the terminals are also redundantly connected to the network in the event of a failure of the network component 9 or of the other network component 11.

FIG. 3 shows another embodiment of the invention. Identical features in FIGS. 1 to 3 are provided with identical reference symbols. In this embodiment, a control device 5 is arranged between the first transmission device 6 and the further transmission device 7 on the one hand, and the media access controller 3 on the other hand. The control device 5 may be an electronically programmable logic device (EPLD) or an application-specific integrated circuit (ASIC). In this embodiment, the failure signals from the first transmission device 6 and the further transmission device 7 are transmitted to the control device 5. In the event of a connecting media failure, the control device 5 carries out the "switching". This may be done transparently for higher network layers. This allows very fast switching. The switching time is in the region of about 1 ms or less. In addition, in this embodiment as well, the connecting media failure can also be transmitted to the higher network protocol layers.

FIG. 4 shows a further embodiment of the invention. Identical features in FIGS. 1 to 4 are provided with identical reference symbols. In this embodiment, a redundancy switch 20 comprises the first transmission device 6, the further transmission device 7 and the control device 5. The redundancy switch 20 is separated from the terminal 1 and is connected to it via a connecting line 21. A data packet to be sent from the terminal 1 to the network 4 comprises the MAC address which is associated with the media access controller 3 for the terminal 1. An analysis device 22 for the redundancy switch 20, which is connected to the control device 5, determines the MAC address which is required for production of the failure message, on the basis of the data packet to be sent. The control device 5 operates in the manner that has been described above for the embodiment shown in FIG. 1. The redundancy switch 20 allows terminals which are not designed in a redundant form to be easily connected with media redundancy to the network 4.

Figure 5:
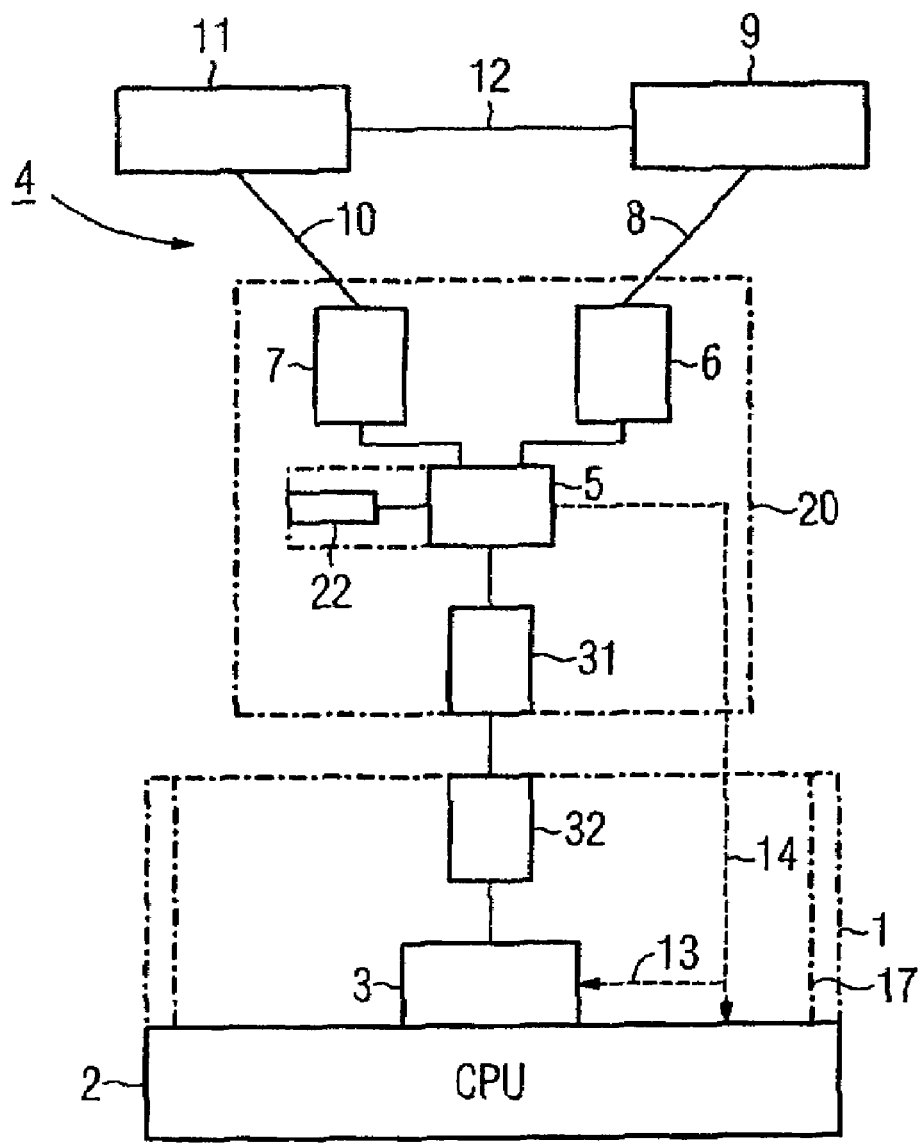
FIG. 5 shows a further apparatus for media-redundant operation of a terminal in a network.

FIG. 5 shows a further embodiment of the invention, similar to that illustrated in FIG. 4. Identical features in FIGS. 4 and 5 are provided with identical reference symbols. In addition to the embodiment shown in FIG. 4, the redundancy switch shown in FIG. 5 has an additional transmission device 31 in the physical bit transmission layer, which is connected to the control device 5. The additional transmission device 31 is connected via an additional connecting medium 33 to another transmission device 32 in the physical bit transmission layer. The other transmission device 32 is formed by the network board 17. The embodiment shown in FIG. 5 is distinguished in that the redundancy switch 20 is designed such that it can be used with the terminal 1, which is not designed in a redundant form, in order to connect the terminal 1 with media redundancy to the network 4. Furthermore, the control device 5 in this embodiment comprises the analysis device 22, as is indicated by a dashed line.

What is claimed is:

1. A method for media-redundant operation of a terminal in a network, comprising:
   automatically monitoring, via a first transmission device in the terminal, which is connected to a media access controller for the terminal, a connection which is formed between the first transmission device and a network component via a first connecting medium;
   producing, from the first transmission device, a failure signal if no connection or a faulty connection is found via the connecting medium during automatic monitoring of the connection, and
   as a reaction to the failure signal,
   deactivating the first transmission device via a control device which is connected to the first transmission device;
   activating, via the control device, a further transmission device, which is connected to the media access controller for the terminal, with a sound physical connection being reproduced between the terminal and the network via a further connecting medium, and
   sending an electronic failure message by means of the further transmission device via the further connecting medium to the network for registration of the further transmission device, wherein the further network components in the network analyze the failure message and adapt their MAC address addressing tables on the basis of the failure message in such a way that data packets which are addressed to the terminal are passed on to the further connecting medium.

2. The method as claimed in claim 1, wherein a data packet to be transmitted from the terminal to the network is analyzed by an analysis device, a media access control address is determined in the process and is assigned to a media access controller for the terminal, and the media access control address is inserted into the electronic failure message during the production of the electronic failure message.

3. The method as claimed in claim 1, wherein a network component is used, to which the first and the further connecting medium are connected.

4. The method as claimed in claim 1, wherein another network component is used, to which the further connecting medium is connected.

5. The method as claimed in claim 1, wherein a communication is carried out from the terminal with the network component by means of a standard network protocol, to check the serviceability of the network component.

6. The method as claimed in claim 1, wherein an application is run on the terminal, and the application interchanges checking data packets after predetermined time intervals with another network component which is connected to the network component to determine whether the network component is serviceable.

7. The method as claimed in claim 4, wherein the other network component produces an application failure signal if it has not received any of the checking data packets after a predetermined number of predetermined time intervals.

8. A method for media-redundant operation of a terminal in a network comprising:
   automatically monitoring, via a first transmission device in the terminal, which is connected to a media access controller for the terminal, a connection which is formed between the first transmission device and a network component via a first connecting medium;
   producing, from the first transmission device, a failure signal if no connection or a faulty connection is found via the connecting medium during automatic monitoring of the connection, and
   as a reaction to the failure signal,
   deactivating the first transmission device via a control device which is connected to the first transmission device;
   activating, via the control device, a further transmission device, which is connected to the media access controller for the terminal, with a sound physical connection being reproduced between the terminal and the network via a further connecting medium, and
   sending an electronic failure message by means of the further transmission device via the further connecting medium to the network for registration of the further transmission device wherein the network component analyzes the failure message and adapts its MAC address addressing table for the media access controller for the terminal such that data packets which are addressed to the terminal are passed on to the further connecting medium.

9. The method as claimed in claim 8, wherein a data packet to be transmitted from the terminal to the network is analyzed by an analysis device, a media access control address is determined in the process and is assigned to a media access controller for the terminal, and the media access control address is inserted into the electronic failure message during the production of the electronic failure message.

10. The method as claimed in claim 8, wherein a network component is used, to which the first and the further connecting medium are connected.

11. The method as claimed in claim 8, wherein another network component is used, to which the further connecting medium is connected.

12. The method as claimed in claim 8, wherein a communication is carried out from the terminal with the network component by means of a standard network protocol, to check the serviceability of the network component.

13. The method as claimed in claim 8, wherein an application is run on the terminal, and the application interchanges checking data packets after predetermined time intervals with another network component which is connected to the network component to determine whether the network component is serviceable.

14. The method as claimed in claim 13, wherein the other network component produces an application failure signal if it has not received any of the checking data packets after a predetermined number of predetermined time intervals.

15. An apparatus for media-redundant operation of a terminal in a network comprising:
a transmission device, which is connected to a media access controller for the terminal, in a physical bit transmission layer, with the first transmission device connected to the network component via a connecting medium which is arranged between the first transmission device and a network component, and, during automatic monitoring of a connection to the network component via the connecting medium, producing a failure signal if there is no physical connection or a faulty physical connection to the network component;
a further transmission device, which is connected to the media access controller for the terminal, in the physical bit transmission layer, with the further transmission device connected to the network via a further connecting medium; and
a control device which is connected to the first transmission device and to the further transmission device and, as a reaction to the failure signal, deactivates the first transmission device, activates the further transmission device, and sends an electronic failure message via the further connecting medium by means of the further transmission device into the network, wherein the failure message contains information that, upon analysis by the further network components in the network, causes the further network components to adapt their MAC address addressing tables on the basis of the failure message in such a way that data packets which are addressed to the terminal are passed on to the further connecting medium.

16. The apparatus as claimed in claim 15, wherein the first and the further connecting medium are connected to the network component.

17. The apparatus as claimed in claim 15, wherein the further transmission device is connected to another network component via the further connecting medium.

18. The apparatus as claimed in claim 15, wherein the transmission device, the further transmission device and the control device are arranged on a network board in the terminal.

19. The apparatus as claimed in claim 15, wherein the transmission device, the further transmission device and the control device are arranged in a redundancy switch, which is connected to the terminal.

20. The apparatus as claimed in claim 19, wherein the redundancy switch has an additional transmission device in the physical bit transmission layer to interchange data packets with the terminal.

21. The apparatus as claimed in claim 15, wherein an analysis device for analysis of a data packet to be transmitted into the network from the terminal to determine a media access control address and to insert the media access control address into the electronic failure message.

22. The apparatus as claimed in claim 21, wherein the control device comprises the analysis device.

23. The apparatus as claimed in claim 15, wherein the control device is an electronically programmable logic device.

24. The apparatus as claimed in claim 15, wherein the control device comprises a media access controller.

25. An apparatus for media-redundant operation of a terminal in a network comprising:
a transmission device, which is connected to a media access controller for the terminal, in a physical bit transmission layer, with the first transmission device connected to the network component via a connecting medium which is arranged between the first transmission device and a network component, and, during automatic monitoring of a connection to the network component via the connecting medium, producing a failure signal if there is no physical connection or a faulty physical connection to the network component;
a further transmission device, which is connected to the media access controller for the terminal, in the physical bit transmission layer, with the further transmission device connected to the network via a further connecting medium; and
a control device which is connected to the first transmission device and to the further transmission device and, as a reaction to the failure signal, deactivates the first transmission device, activates the further transmission device, and sends an electronic failure message via the further connecting medium by means of the further transmission device into the network, wherein the failure message contains information that, upon analysis by the network component, causes the network component to adapt its MAC address addressing table for the terminal in such a way that data packets which are addressed to the terminal are passed on to the further connecting medium.

26. The apparatus as claimed in claim 25, wherein the first and the further connecting medium are connected to the network component.

27. The apparatus as claimed in claim 25, wherein the further transmission device is connected to another network component via the further connecting medium.

28. The apparatus as claimed in claim 25, wherein the transmission device, the further transmission device and the control device are arranged on a network board in the terminal.

29. The apparatus as claimed in claim 25, wherein the transmission device, the further transmission device and the control device are arranged in a redundancy switch, which is connected to the terminal.

30. The apparatus as claimed in claim 17, wherein the redundancy switch has an additional transmission device in the physical bit transmission layer to interchange data packets with the terminal.

31. The apparatus as claimed in claim 25, wherein an analysis device for analysis of a data packet to be transmitted into the network from the terminal to determine a media access control address and to insert the media access control address into the electronic failure message.

32. The apparatus as claimed in claim 31, wherein the control device comprises the analysis device.

33. The apparatus as claimed in claim 25, wherein the control device is an electronically programmable logic device.

34. The apparatus as claimed in claim 25, wherein the control device comprises a media access controller.

* * * * *